(12) United States Patent
Hynicka et al.

(10) Patent No.: US 6,818,282 B2
(45) Date of Patent: Nov. 16, 2004

(54) RESILIENT FLOORING STRUCTURE WITH ENCAPSULATED FABRIC

(75) Inventors: Steven F. Hynicka, Lancaster, PA (US); Donald E. Barshinger, East Prospect, PA (US); Donald E. Schneider, Lititz, PA (US)

(73) Assignee: AWI Licensing Company, Wilmington, DE (US)

( * ) Notice: Subject to any disclaimer, the term of this patent is extended or adjusted under 35 U.S.C. 154(b) by 177 days.

(21) Appl. No.: 10/144,904

(22) Filed: May 14, 2002

(65) Prior Publication Data

US 2003/0215618 A1 Nov. 20, 2003

(51) Int. Cl.[7] .................. B32B 27/04; B32B 27/12; B32B 5/18; B32B 5/24
(52) U.S. Cl. .................. 428/196; 442/30; 442/38; 442/43; 442/45; 442/56; 442/58; 442/148; 442/226; 442/286; 442/288
(58) Field of Search .................. 442/30, 38, 43, 45, 56, 58, 64, 71, 148, 149, 221, 226, 286, 288; 428/196

(56) References Cited

U.S. PATENT DOCUMENTS

| | | | |
|---|---|---|---|
| 3,968,275 A | 7/1976 | Dees, Jr. et al. | 427/270 |
| 4,018,957 A | 4/1977 | Werner et al. | 428/141 |
| 4,469,729 A | 9/1984 | Watanabe et al. | 428/36 |
| 4,471,018 A | 9/1984 | Kritchevsky et al. | 428/220 |
| 4,474,840 A | 10/1984 | Adams | 428/71 |
| 4,503,114 A * | 3/1985 | Cohen | 442/41 |
| 4,510,201 A | 4/1985 | Takeuchi et al. | 428/285 |
| 4,517,236 A | 5/1985 | Meeker et al. | 428/192 |
| 4,542,053 A | 9/1985 | Nevins et al. | 428/48 |
| 4,603,074 A | 7/1986 | Pate et al. | 428/172 |
| 4,721,642 A | 1/1988 | Yoshimi et al. | 428/90 |
| 4,816,319 A | 3/1989 | Dees, Jr. et al. | 428/167 |
| 4,853,280 A | 8/1989 | Poteet | 428/286 |
| 4,874,663 A | 10/1989 | Marshall | 428/272 |
| 4,880,689 A | 11/1989 | Park et al. | 428/143 |
| 4,910,070 A | 3/1990 | Al'Hariri | 428/181 |
| 4,916,007 A | 4/1990 | Manning et al. | 428/203 |
| 4,971,855 A | 11/1990 | Lex et al. | 428/206 |
| 5,001,003 A * | 3/1991 | Mahr | 428/247 |
| 5,030,498 A | 7/1991 | Okada et al. | 428/99 |
| 5,073,425 A | 12/1991 | Dees, Jr. et al. | 428/48 |
| 5,093,185 A | 3/1992 | Ungar et al. | 428/204 |
| 5,169,704 A | 12/1992 | Faust et al. | 428/143 |
| 5,208,080 A | 5/1993 | Gajewski et al. | 428/1 |
| 5,260,118 A | 11/1993 | Lussi et al. | 428/203 |
| 5,318,832 A | 6/1994 | Fishel et al. | 428/287 |
| 5,405,674 A | 4/1995 | Wang et al. | 428/158 |
| 5,413,870 A | 5/1995 | Flood | 428/542.2 |
| 5,480,705 A | 1/1996 | Tolliver et al. | 428/217 |
| 5,604,025 A | 2/1997 | Tesch | 442/394 |
| 5,633,063 A | 5/1997 | Lause et al. | 428/71 |
| 5,643,677 A | 7/1997 | Feifer et al. | 428/424.6 |
| 5,670,235 A | 9/1997 | Stricker et al. | 428/138 |
| 5,693,407 A * | 12/1997 | Swanson, Jr. | 428/195 |
| 5,709,921 A | 1/1998 | Shawver | 428/152 |
| 5,728,476 A | 3/1998 | Harwood et al. | 428/500 |
| 5,747,133 A | 5/1998 | Vinod et al. | 428/46 |
| 5,763,001 A | 6/1998 | Brown | 427/140 |
| 5,763,333 A | 6/1998 | Suzuki et al. | 442/351 |
| 5,910,358 A | 6/1999 | Thoen et al. | 428/316.6 |
| 5,928,734 A | 7/1999 | Scherf | 428/31 |
| 5,928,778 A | 7/1999 | Takahashi et al. | 428/323 |
| 5,955,173 A | 9/1999 | Balmer et al. | 428/142 |
| 5,965,232 A | 10/1999 | Vinod | 428/85 |
| 5,989,668 A | 11/1999 | Nelson et al. | 428/50 |
| 6,020,044 A | 2/2000 | Sugihara | 428/85 |
| 6,040,044 A | 3/2000 | Takahashi et al. | 428/323 |
| 6,063,473 A | 5/2000 | Zafiroglu | 428/86 |
| 6,093,473 A | 7/2000 | Min | 428/147 |
| 6,156,682 A | 12/2000 | Fletemier et al. | 442/394 |
| 6,159,583 A | 12/2000 | Calkins | 428/195 |
| 6,294,488 B1 | 9/2001 | Tippett | 442/289 |
| 6,316,075 B1 | 11/2001 | Desai et al. | 428/87 |
| 6,326,073 B1 | 12/2001 | Sager et al. | 428/58 |
| 6,337,126 B1 | 1/2002 | Simpson et al. | 428/308.4 |
| 6,352,948 B1 | 3/2002 | Pike et al. | 442/384 |
| 6,649,248 B1 * | 11/2003 | Schneider et al. | 428/161 |
| 2001/0000162 A1 | 4/2001 | Fletemier et al. | 442/35 |
| 2002/0009572 A1 | 1/2002 | Davies | 428/96 |
| 2002/0016121 A1 | 2/2002 | Bjekovic et al. | 442/373 |
| 2002/0022428 A1 | 2/2002 | Parker et al. | 442/394 |

FOREIGN PATENT DOCUMENTS

| | | | | |
|---|---|---|---|---|
| EP | 0 329 577 B1 | 4/1992 | | D06C/23/04 |
| EP | 0 892 105 A1 | 7/1998 | | D06P/5/15 |
| GB | 2 020 576 A | 11/1979 | | D06N/7/00 |
| WO | WO 97/01665 | 1/1997 | | D06N/7/00 |
| WO | WO 98/14656 | 4/1998 | | D06N/7/00 |
| WO | WO 99/58348 A | 11/1999 | | B44C/5/04 |
| WO | WO 00/67999 A1 | 11/2000 | | B32B/3/00 |

OTHER PUBLICATIONS

European Search Report Communication—Application No. EP 03 01 0133 dated Sep. 17, 2003.
Database WPI, XP-002251884, abstract of JP54 081629 dated Jun. 29, 1979.

* cited by examiner

Primary Examiner—Cheryl A. Joska
Assistant Examiner—Jenna-Leigh Befumo

(57) ABSTRACT

A laminated fabric floor product having an encapsulated fabric scrim within a vinyl resilient flooring structure. The laminated fabric floor product structure includes a PVC calendered base, a first hot melt film, a fabric, a second hot melt film, a calendered clear film, and a high performance coating. Traditional foamed and non-foamed substrates used in the flooring industry can be used in addition to the calendered base. All types of fabrics and scrims can be encapsulated. The fabrics can be both woven and non-woven types. Open scrims can be used with base layers that are printed or have a visual pattern so that design features and colors can be seen through the open areas of the scrim. The fabric layer can be printed with a design pattern and adhered to the base layer or substrate by the first hot melt adhesive film layer. The clear layer is adhered to the fabric layer by the second hot melt adhesive layer.

17 Claims, 3 Drawing Sheets

RESILIENT FLOORING STRUCTURE WITH ENCAPSULATED FABRIC

BACKGROUND OF THE INVENTION

The present invention relates to resilient surface coverings and more particularly to resilient composite floor coverings having an encapsulated fabric or scrim to provide an enhanced aesthetic appearance.

Decorative floor coverings such as carpets and vinyl for both commercial and home use are well known in the art. Carpet coverings generally provide a different aesthetic appearance than vinyl, but lack the strength, impact resistance and durability of vinyl. A resilient floor covering signifies the ability of the floor covering to recover from deformations, such as indentations created by furniture legs, shoe heels, dropped objects and the like. The ability to recover distinguishes resilient floor coverings from other types of floor coverings such as carpeting, wood, ceramic and stone. Therefore, it is desirable to provide a resilient composite floor covering that combines the advantages of vinyl with the aesthetic appearance provided by a fabric or scrim having a printed design.

SUMMARY OF THE INVENTION

In one embodiment, the laminated fabric floor product of the present invention has a structure that contains an encapsulated fabric or scrim within a vinyl resilient flooring structure. The laminated fabric floor product structure includes a PVC calendered base, a first hot melt film, fabric, a second hot melt film, a calendered clear film, and a high performance coating.

Other substrates besides the calendered base can be used. These can include traditional foamed and non-foamed substrates utilized in the flooring industry. All types of fabrics and scrims can be utilized. Tight fabrics that are printed with a design can be used. The fabrics can be woven and non-woven types. Additionally, scrims that are more open can also be employed. The open scrims can be used with base layers that are printed or have a visual pattern so that design features, color, etc. can be seen through the open areas of the scrim. Additionally, such open scrims can also be printed so that the scrim contains a pattern and/or color that complements the pattern or color of the base layer.

In another embodiment, the base, hot melt films, and calendered clear film would all be films introduced along with the desired fabric at the press nip. The fabric material can be anything available today. The heaviest gauge material that has been incorporated into the structure thus far is upholstery material. A high performance coating is applied later in the manufacturing process. One manufacturing process option for this embodiment is a lamination process that laminates the fabric or scrim layer using an auma. Other process options exist for incorporating/encapsulating these type scrims into flooring.

In another embodiment, a desired pattern is printed on a scrim structure. A filled calendered base layer is prepared, and a plastisol is applied by rotary screen. The scrim (e.g., woven or nonwoven glass mat) is introduced into the plastisol and the plastisol gelled. The desired pattern is then printed by rotogravure onto the surface of the scrim. Another layer of plastisol is applied, and the composite is oven-fused. A hot melt calendered clear layer is then applied. Finally, a high performance coating is applied using well-known soft roll or air knife coating processes.

In yet another embodiment, a desired pattern is printed under the scrim. A calendered base is again prepared. The desired pattern is printed on the calendered base by rotogravure. A plastisol is then applied by rotary screen. The scrim is pushed into the wet plastisol. The composite is then oven-fused. A hot melt calendered clear layer is then applied. The high performance coating is applied to complete the process.

DETAILED DESCRIPTION OF THE INVENTION

The present invention is directed to resilient floor coverings that encapsulate a fabric or scrim within the flooring structure, and processes for manufacturing the flooring structure. The invention is described in the context of exemplary embodiments, but the embodiments disclosed are not intended as limitations of the invention. The materials and process steps used to form the flooring structures are well known in the art. However, those skilled in the art have not used the combination of materials and process steps in the order of the present invention to enhance the aesthetic appearance of flooring structures as described herein.

Figure 1:
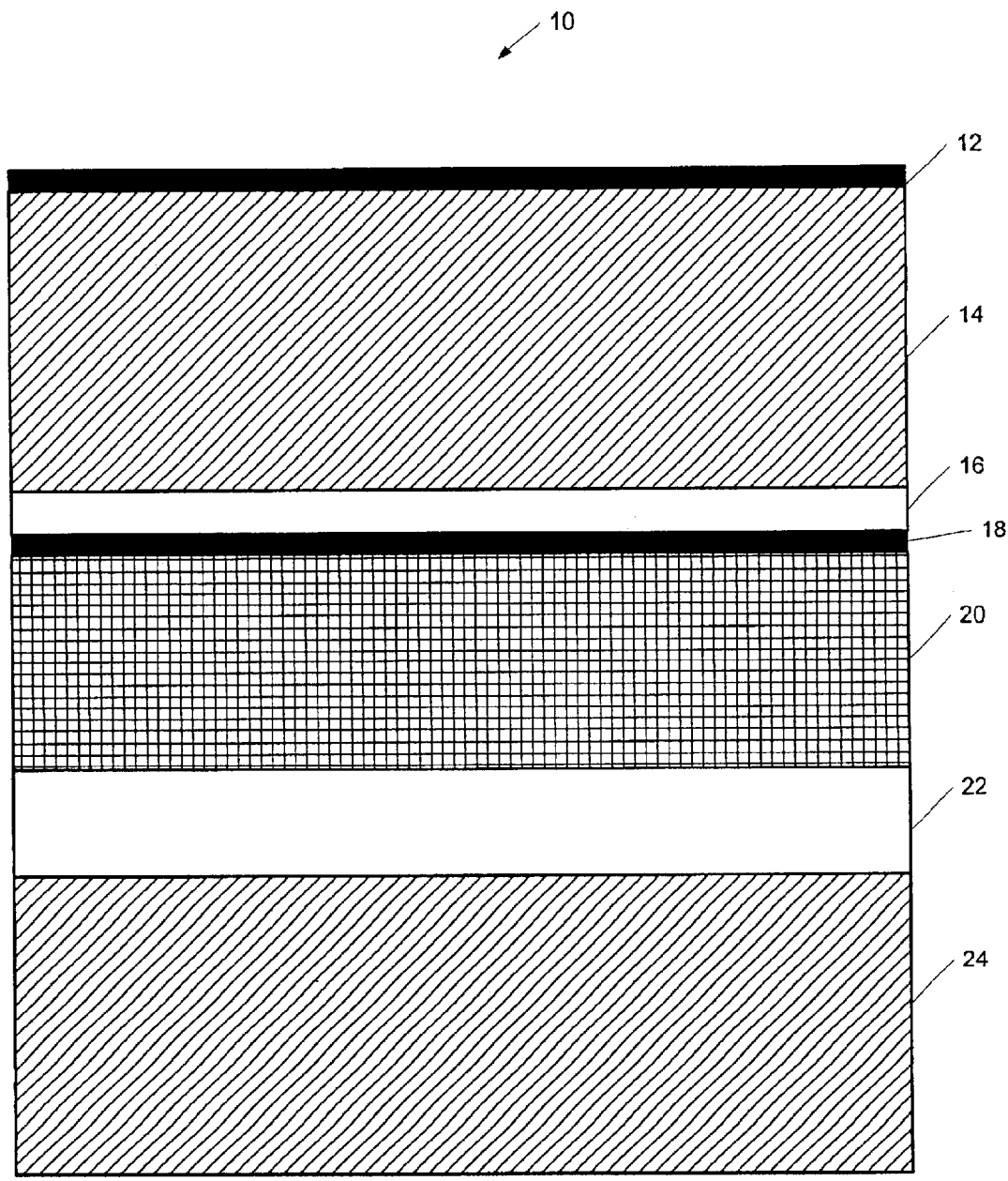
FIG. 1 illustrates a print on scrim resilient flooring structure in accordance with an exemplary embodiment of the present invention.
Figure 2:
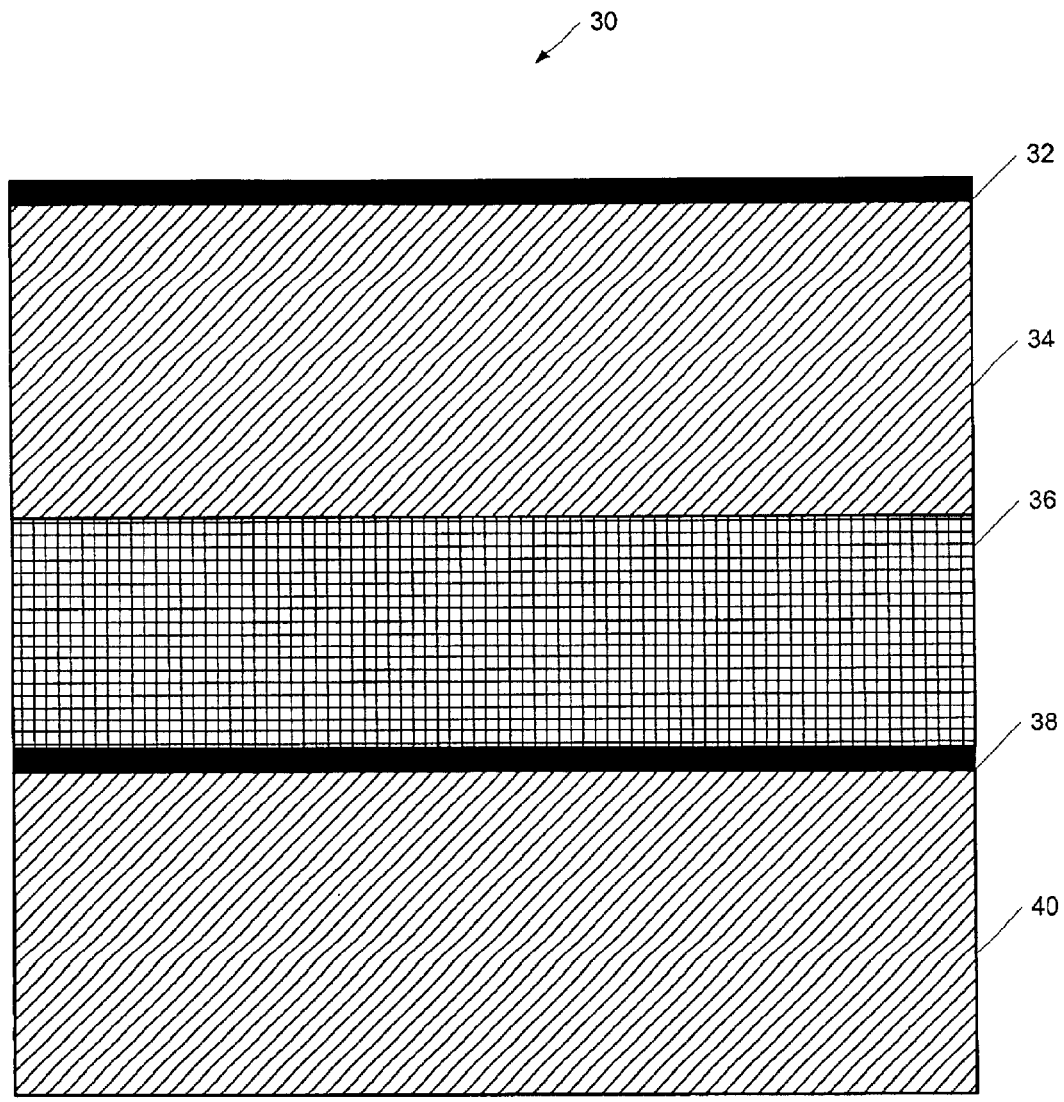
FIG. 2 illustrates a print under scrim resilient flooring structure in accordance with an exemplary embodiment of the present invention.
Figure 3:
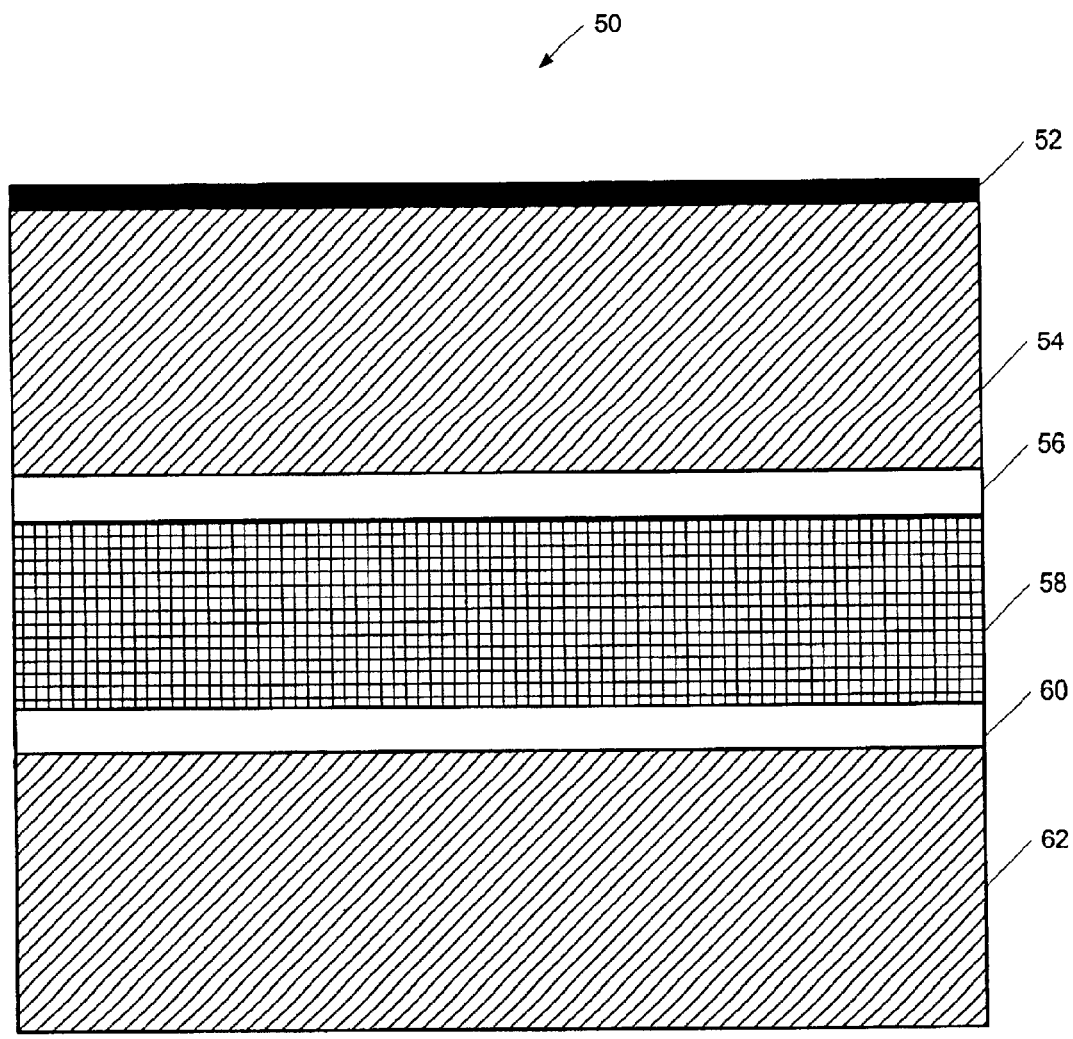
FIG. 3 illustrates a laminated fabric flooring structure in accordance with an exemplary embodiment of the present invention.

FIGS. 1–3 show different embodiments of the present invention that include either an encapsulated scrim or fabric layer to enhance the aesthetic appeal of resilient flooring. All types of fabric and scrims can be used, including woven, braided, knitted, and non-woven types. In the present context, a fabric or scrim is a generally planar textile structure of yarns, filaments and fibers having a facing and a lower surface. The "open" character of the fabric and scrims can be achieved through normal manufacturing methods, or through post punching or removal of segments/sections of the finished fabric. The facing of the fabric can be plain or carry a decorative design. Colors and design patterns can be applied to the fabrics by conventional techniques such as dyeing the yarns, filaments, or fibers or by dyeing or printing the fabric itself. Printing involves applying a coloring agent to the fabric and treating the fabric with heat or chemicals to fix the coloring agent. The fabric can be decorated via gravure printing, screen printing, spray printing or by other conventional means. The only limitation on the design/decoration is that it be stable during the manufacturing process and during the lifetime of the flooring product.

Fabrics can be natural or synthetic fibers, including wool, cotton, polyamides, polyesters, polyolefins, acrylics, rayon, silk, etc. In addition, fabrics can be textured or non-textured. The fabrics can be either woven or non-woven. Woven fabrics refer to fabrics formed by weaving two sets of yarns. Non-woven fabrics refer to an assembly of textile fibers held together by interlocking the fibers in a mat, by fusing of the fibers, or by bonding the fibers with an adhesive. Depending upon the nature of the fabric fibers, and the polymeric composition of the substrate and wear layer, it is possible that excellent adhesion can be achieved between the fabric and the adjacent layers. However, if adhesion needs to be improved, the fabric can be treated with surface treatments to improve adhesion (for example silane coupling agents for glass fabrics), or adhesive layers such as hot melt adhesives can be employed.

One substrate utilized in the structures of the present invention is a polyvinyl chloride (PVC) calendered base layer. Any traditional foamed or non-foamed substrates used in the flooring industry also can be used as the base layer. Some examples of substrates are solid, filled or unfilled polymeric layers or composites, solid layer composites including fibrous webs saturated with polymeric binder, and one or more porous fibrous layers. Melt-processed base layers formed of resins composed of PVC homopolymers provide strength and durability to the floor covering. patent application Ser. No. 09/853,291, filed May 5, 2001 and having the same assignee as the present invention, discloses enhanced resilient floor coverings that can be used with the present invention. The entire disclosure of this patent application is incorporated by reference herein. An adhesive layer can be applied to the substrate to provide adequate adhesion of the fabric or scrim layer.

A clear layer is located above the fabric and can be any composition as long as it is compatible with the rest of the flooring structure. The clear layer can be continuous or discontinuous. The clear layer may also function as the wear layer, or a component of the wear layer in the flooring product. For example a hot melt calendered clear layer or wear layer is applied above the fabric or scrim layer. patent application Ser. No. 09/200,813, filed Nov. 27, 1998 and having the same assignee as the present invention, discloses hot melt calendered polymer resin wear layers for embossed or textured substrates, and a process for hot melt calendering. As described in the pending patent application, the melt processable layer can be formed and applied by melt calender equipment in widths that are limited only by equipment and substrate availability. A melt processable polymer resin can be delivered as a melt-processable extrudate to a three roll calender, where the polymer resin composition is further softened by the heated rolls. The hot melt composition can also be introduced as a film. The film is subsequently melted or softened and applied to the substrate with a calender or heated drum and conformable pressure roll. The entire disclosure of this patent application is incorporated by reference herein. If necessary, an adhesive layer is applied to the fabric or scrim layer to provide adequate adhesion of the clear, wear layer. A high performance coating is applied after the composite structure is formed. The high performance coating can be urethane, polyester or UV curable.

FIG. 1 shows a print on scrim resilient flooring structure 10. The print on scrim structure 10 includes a base layer 24 having a thickness of about 40 mils, a first plastisol layer 22 having a thickness of about 10 mils, a scrim 20 having a thickness of about 10 mils, a second plastisol layer 16 (optional) having a thickness of about 5 mils, a hot melt calendered clear layer 14 having a thickness of about 15 mils and a high performance coating 12.

The print on scrim structure is formed by performing the following steps. A filled calendered base layer 24 is first prepared. A plastisol 22 is then applied by rotary screen to the calendered base layer 24. The plastisol thickness depends on the scrim gauge. The scrim 20 is next introduced into the plastisol 22 using the nip of a rotary drum. The scrim 20 can include a woven glass mat or a non-woven mat. The gap between the drum and rubber roll is adjusted to prevent or minimize saturation of the plastisol to the scrim surface. The composite structure is then gelled around the heated drum using a process that is further described in patent application Ser. No. 09/853,291 referenced above. A desired pattern 18 is printed by rotogravure on the protruding surface of scrim 20. A second plastisol 16 is then applied by rotary screen to the scrim 20. The plastisol coating, which can be applied by roll or blade, helps tie in the glass fibers of a woven glass mat scrim and acts as a key coat for bonding of the hot melt calendered clear layer 14 to the glass mat scrim 20. This composite structure is then oven fused. The calendered clear layer 14 is then applied to the composite structure using the process described in above-referenced patent application Ser. No. 09/200,813. Finally, the high performance coating 12 is applied using well known soft roll or air knife type coating processes.

The desired visual pattern 18 can be printed only on the surface of the scrim 20. If the scrim 20 is an open or weave type, the printed visual 18 is localized only on the scrim thereby producing a discontinuous pattern that follows the detail of the scrim's construction. It is also possible to embed the scrim into the vinyl base layer 24 to produce a smooth surface that can be printed. In this instance, the print image is not confined to the scrim surface.

FIG. 2 shows a print under scrim resilient flooring structure 30. The print under scrim structure 30 includes a base layer 40 having a thickness of about 45–55 mils, a scrim 36 and plastisol coating having a combined thickness of about 5–15 mils, a hot melt calendered clear layer 34 having a thickness of about 15 mils and a high performance coating 32.

The print under scrim structure is formed by performing the following steps. A filled calendered base layer 40 is first prepared. A desired pattern 38 is printed by rotogravure on the calendered base layer 40. A plastisol is then applied by rotary screen with the thickness of the plastisol application depending on the scrim used. The plastisol coating should be greater than the scrim gauge. The scrim 36 is then laid onto the wet plastisol. The scrim 36 must be constructed so that the print pattern 38 can show through and be seen. A whisper blade may be required to push the scrim 36 into the wet coating to the extent that the plastisol coats the scrim surface. This is necessary for adhesion purposes. This composite structure is then oven-fused. The calendered clear layer 34 is then applied to the composite structure using the process described in above-referenced patent application Ser. No. 09/200,813. Finally, the high performance coating 32 is applied using well known soft roll or air knife type coating processes.

FIG. 3 shows a laminated fabric flooring structure 50. The laminated fabric flooring structure 50 includes a base layer 62 having a thickness of about 40 mils, a hot melt adhesive layer 60, a fabric layer 58, a second adhesive hot melt layer 56, a hot melt calendered layer 54 having a thickness of about 20 mils, and a high performance coating 52. The base layer 62, hot melt films 56, 60 and calendered clear layer 54 can all be films introduced along with the desired fabric 58 at the press nip on an Auma line.

The corresponding structures, materials, acts, and equivalents of all means plus function elements in any claims below are intended to include any structure, material or acts for performing the functions in combination with other claim elements as specifically claimed.

Those skilled in the art will appreciate that many modifications to the exemplary embodiment of the present invention are possible without departing from the spirit and scope of the present invention. Some of those possible modifications have been discussed herein. In addition, it is possible to use some of the features of the present invention without the corresponding use of the other features. Accordingly, the foregoing description of the exemplary embodiment is provided for the purpose of illustrating the principles of the present invention and not in imitation thereof since the scope of the present invention is defined solely by the appended claims.

What is claimed is:

1. A resilient flooring structure comprising:
   a composite substrate;
   a fabric layer printed with a design pattern and adhered to the substrate; and
   a clear layer adhered to the fabric layer opposite the substrate, wherein the clear layer is discontinuous and the design pattern can be seen through the clear layer.

2. The resilient flooring structure of claim 1 wherein the substrate comprises a polyvinyl chloride calendered base layer.

3. The resilient flooring structure of claim 2 wherein the calendered base layer is about 20 mils to about 60 mils in thickness.

4. The resilient flooring structure of claim 1 wherein the substrate comprises a foam layer.

5. The resilient flooring structure of claim 1 wherein the fabric layer is a woven material.

6. The resilient flooring structure of claim 1 further comprising an adhesive layer between the substrate and the fabric layer, and/or an adhesive layer between the printed fabric and the clear layer.

7. The resilient flooring structure of claim 1 wherein the printed fabric layer is selected from the group consisting of tight fabrics, open fabrics, open scrims, braided fabrics, knitted fabrics and punched fabrics.

8. The resilient flooring structure of claim 1 further comprising a discontinuous opaque layer interposed between the fabric layer and the clear layer.

9. A resilient flooring structure comprising:
   a substrate;
   a scrim layer adhered to the substrate; and
   a clear layer adhered to the scrim layer opposite the substrate, wherein the clear layer is discontinuous, and the scrim layer and substrate can be seen through the clear layer.

10. The resilient flooring structure of claim 9 wherein the scrim layer is a non-woven material.

11. The resilient flooring structure of claim 9 wherein the scrim layer is colored or comprises a pattern or solid color printed on the upper surface of the scrim.

12. The resilient flooring structure of claim 9 wherein the scrim layer has a thickness from about 5 mils to about 20 mils.

13. The resilient flooring structure of claim 9 wherein the substrate comprises a visible pattern or printed design.

14. The resilient flooring structure of claim 9 wherein the substrate comprises a polyvinyl chloride calendered base layer.

15. The resilient flooring structure of claim 14 wherein the substrate has a thickness from about 20 mils to about 60 mils.

16. The resilient flooring structure of claim 9 wherein the substrate comprises a foam layer.

17. The resilient flooring structure of claim 9 further comprising a discontinuous opaque layer interposed between the scrim layer and the clear layer.

* * * * *